United States Patent [19]

McGlothlin

[11] Patent Number: 5,729,956
[45] Date of Patent: Mar. 24, 1998

[54] AQUA AMMONIA PRODUCTION BY DESORPTION

[75] Inventor: Mark W. McGlothlin, San Diego, Calif.

[73] Assignee: Apex Medical Technologies, Inc, San Diego, Calif.

[21] Appl. No.: 636,412

[22] Filed: Apr. 23, 1996

[51] Int. Cl.$^6$ ................................................ B65B 31/00
[52] U.S. Cl. ........................ 53/428; 53/434; 423/472
[58] Field of Search ................... 53/428, 432, 434, 53/400, 111 R, 510, 512, 111 RC; 34/472; 423/237

[56] References Cited

U.S. PATENT DOCUMENTS

| | | | |
|---|---|---|---|
| 3,436,352 | 4/1969 | Revoir et al. | 423/237 X |
| 3,486,295 | 12/1969 | Rausing et al. | 53/432 X |
| 3,514,963 | 6/1970 | Reimschuessel et al. | 53/400 X |
| 3,531,246 | 9/1970 | Matsen | 95/128 |
| 4,334,756 | 6/1982 | Michlin et al. | 423/237 X |
| 4,758,250 | 7/1988 | Laciak et al. | 95/128 |
| 4,815,369 | 3/1989 | Akins | 53/11 RC |
| 5,013,335 | 5/1991 | Marcus | 95/128 |
| 5,125,935 | 6/1992 | Nakaya et al. | 95/128 |
| 5,160,512 | 11/1992 | Talu | 95/128 |
| 5,234,884 | 8/1993 | Mouri et al. | 95/128 |
| 5,589,146 | 12/1996 | Morii et al. | 423/237 |

FOREIGN PATENT DOCUMENTS 2101870  1/1983  United Kingdom ............ 53/400

*Primary Examiner*—Linda Johnson
*Attorney, Agent, or Firm*—Patent & Trademark Services; Joseph H. McGlynn

[57] ABSTRACT

A method of producing ammonia water (aqua ammonia) by means of desorbing an ammonia laden sorbent, preferably a zeolite molecular sieve or silica gel into water. The method includes placing an activated sorbent material into a sealed vessel, such as a pressure pot, and exposing it to ammonia gas for a period of time. After loading by exposure to ammonia gas, the loaded sorbent is then placed into an air and water tight container for storage. The pouch can be stored for extended lengths of time prior to use of the contents. When ready for use, the contents of the pouch are dropped into a container of water. In one preferred use of the loaded sorbents, the container of water is a toilet bowl. In another preferred embodiment, the container is a separate disposal pouch, such as a small plastic bag capable of holding an ostomy pouch, sanitary napkin or incontinence pad. After use, the ostomy pouch or other device can be made to dissolve by placing the used pouch in ammonia water at a pH of 10.3 or higher.

4 Claims, 3 Drawing Sheets

AQUA AMMONIA PRODUCTION BY DESORPTION

BACKGROUND OF THE INVENTION

This invention relates, in general, to a method of producing ammonia water, and, in particular, to a method of producing ammonia water (aqua ammonia) by means of desorbing an ammonia laden sorbent, preferably a zeolite molecular sieve or silica gel into water and, in addition, to a method of using the resultant ammonia to dissolve flushable ostomy pouches when placed into the ammoniated water spot of a toilet.

DESCRIPTION OF THE PRIOR ART

In the prior art various methods of producing ammonia water have been proposed. For example, U.S. Pat. No. 3,531,246 discloses a method in which a solid sorbent material is impregnated with a selective dissociable complexing agent, and the preferred solid sorbents are molecular sieves, and the preferred complexing agents are metal halides, such as zinc chloride and magnesium bromide, for improved synthesis, and olefin complexing salts such as copper chloride are employed for improved olefin separations.

U.S. Pat. No. 4,758,250 discloses a process for separating ammonia from mixtures of other gases or from aqueous streams. The ammonia containing mixture is contracted with an anion exchange polymer cast into membrane form, which selectively permeates $NH_3$ thereby providing a separation from the other components in the mixture. This reference also discloses an ammonia recovery may be achieved by employing an anion exchange polymer as a selective, reversible $NH_3$ sorbent.

U.S. Pat. No. 5,013,335 discloses a process and a product which are useful in removing ammonia from an environment to alleviate health hazards or unpleasant odor which involves sequestering aqueous ammonia in large amounts on zeolite molecular sleeves having high proportions of silica with respect to alumina in their crystal frameworks.

U.S. Pat. No. 5,160,512 discloses a method for removal of a gas constituent from a gas stream employing a composite sorbent material.

U.S. Pat. No. 5,234,884 discloses a precipitate composition comprising a water-insoluble phosphate of at least one metal selected from the group consisting of Ti, Zr and Sn, and a hydroxide of Fe, Co, Ni, Zn and Cu. The precipitate composition is disclosed as being used as an adsorbent composition for acidic malodorous gases such as hydrogen sulfide and alkaline malodorous gases such as ammonia.

While the prior art recognizes the basic process of acquiring ammonia, none of the prior art processes utilize a simple, easy to use process. Also, none of the prior art devices utilize the recovered ammonia for other useful purposes.

SUMMARY OF THE INVENTION

The present invention produces ammonia water (aqua ammonia) by means of desorbing an ammonia laden sorbent, preferably a zeolite molecular sieve or silica gel into water. The method includes placing an activated sorbent material into a sealed vessel, such as a pressure pot and exposing it to ammonia gas for a period of time. After loading by exposure to ammonia gas, the loaded sorbent is then placed into an air and water tight container for storage. The pouch can be stored for any length of time prior to use of the contents. When ready for use, the contents of the pouch are dropped into a container of water. In one preferred use of the loaded sorbents, the container of water is a toilet bowl. In another preferred embodiment, the container is a separate disposal pouch, such as a small plastic bag capable of holding an ostomy pouch, sanitary napkin or incontinence pad. After use, the ostomy pouch or other device can be made to dissolve by placing the used pouch in ammonia water at a pH of 10.3 or higher. In the alternative, at least some of the loaded sieve material can be placed directly into the used ostomy pouch. Water can be added to the inside of the pouch, and the pouch can then be sealed off. The pouch will then dissolve very rapidly from the inside out.

It is an object of the present invention to provide an improved method of producing ammonia water.

It is an object of the present invention to provide an improved method of dissolving an ostomy pouch, sanitary napkin or incontinence pad.

These and other objects and advantages of the present invention will be fully apparent from the following description, when taken in connection with the annexed drawings.

DESCRIPTION OF THE PREFERRED EMBODIMENT

Figure 1:
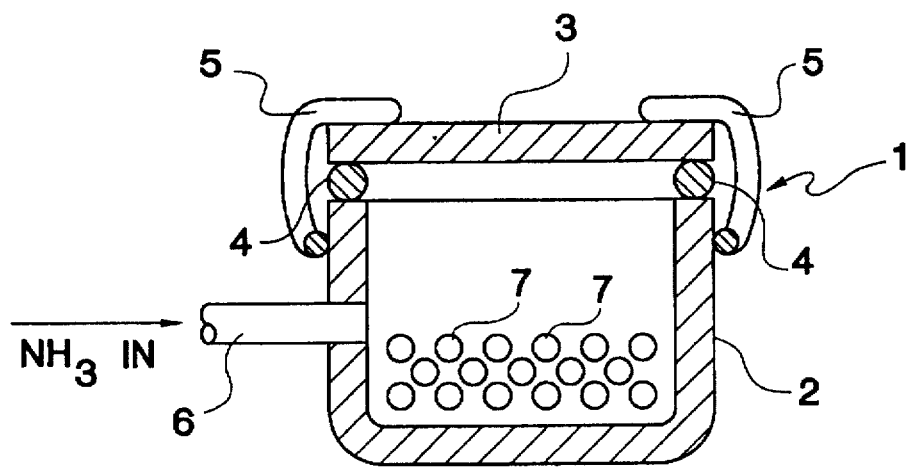
FIG. 1 is a schematic view of an apparatus used in the manufacture of the present invention.

Referring now to the drawings in greater detail, FIG. 1 shows a schematic illustrating the apparatus 1 which is used to produce the sorbent material 7 which are exposed to ammonia gas. The sorbent material 7, which is preferably a zeolite molecular sieve or a silica gel material (although other materials can also be used) is placed into a container such as a pressure pot 2. The pot is sealed by means of a lid 3, a gasket 4, and latches 5. The specific type of container, gasket and latches used are not material as long as they serve the intended function, i.e. to provide a sealed container which will hold the ammonia gas sealed inside. Placed in the side of the container is a tube or pipe 6 through which the ammonia gas will be introduced into the container 2.

After the container 2 is filled with the sorbent material 7 and the ammonia gas, the inlet pipe 6 is sealed, by any conventional means such as, but not limited to, a valve, and the sorbent material 7 will be exposed to the ammonia gas for a period of time, anywhere from about a minute to 24 hours or more. The most preferred charging conditions are 2.5 hours at 5 PSIG for a zeolite 13X material. A method for manufacturing the zeolite 13X material is disclosed in U.S. Pat. No. 2,882,244, which is hereby incorporated by reference.

After about 2.5 hours, under these conditions, very little additional ammonia is adsorbed onto the sorbent material. The exact adsorption conditions are not critical, since the sorbents will selectively adsorb the ammonia gas even when other gasses are present. It is important, however, to minimize the presence of water in the gas or mixture of gasses during the adsorption process, since water will adsorb preferentially to ammonia in most cases. During this charging period, the ammonia gas adsorbs onto the sorbent material 7, effectively immobilizing the ammonia gas onto the surface of the molecular sieve.

Ammonia gas is very dangerous from a health perspective, it is an extreme irritant to the respiratory system, and inhalation of high concentrations of the ammonia gas can be fatal. By adsorbing the gas onto the molecular sieve or other sorbent material 7, the ammonia gas is sequestered and, therefore, is much safer to handle. The preferred sorbent materials are molecular sieves of UOP types 4A, 5A, and 13X, sold by UOP and by Zeochem. A method for manufacturing the type A molecular sieve is disclosed in U.S. Pat. No. 2,882,243, which is hereby incorporated by reference. Also, a type Y zeolite which can be manufactured by the method discloses in U.S. Pat. No. 3,130,007, which is hereby incorporated by reference, can also be used.

Silica gel materials can also be used as sorbents, one specific material is called Envisorb A, also called AF25 (made by Englehard). Other sorbent materials that can strongly adsorb ammonia, and which release it in the presence of water, including some naturally occurring molecular sieve minerals can also potentially be used, but are not the most preferred materials due to lower adsorption capacities.

In order to develop a safe, controllable method of creating Ammonia water the study of several different materials onto which gaseous Ammonia can be adsorbed has been undertaken.

MATERIALS STUDIED

| Molecular Sieve | | |
|---|---|---|
| 13x | 8 × 12" Beads | 1/16" Pellets |
| 5A | 8 × 12" Beads | 1/16" Pellets |
| 4A | 8 × 12" Beads | |
| Silica Gel | 28-200 Mesh | 14-20 Mesh |
| Envisorb A | 3 mm particles | irregular particles |

DETERMINATION OF LOADING CAPACITIES FOR EACH DIFFERENT TYPE OF MATERIAL

These values were obtained in the following manor. A sample of each material was weighed out and placed into an $NH_3$ environment for a period of 2 hours. At the end of this 2 hour period each sample was removed from the $NH_3$ environment and weighed. The difference between initial weight and final weight was found and then divided by the initial weight. That value was then multiplied by 100 to obtain the % loading value for each material. Below is a summary of the results.

TABLE 1

Percent Loading of Different Types of Materials

| Material Type | % Loading of NH3 |
|---|---|
| 13x (8 × 12" Beads) | 14.3 |
| Envisorb A | 12.2 |
| 4A (8 × 12" Beads) | 11.8 |
| 5A (8 × 12" Beads) | 10.0 |
| 13x (1/16" Pellets) | 16.5 |
| Silica Gel (28-200 Mesh) | 10.2 |
| Silica Gel (14-20 Mesh) | 11.9 |
| Envisorb A | 12.4 |

In order to determine the ideal loading time, a sample of 13x(1/16" pellets) was placed in an $NH_3$ environment under 5 psi, with the weight of the sample being recorded every 30 minutes until the weight no longer changed. Once the weight remained steady then the amount of time required to fully charge a sample of material would be known. It was found that it takes approximately 2.5 hours to fully load a sample with $NH_3$.

It is possible to load the ammonia gas Onto the sorbent in additional ways, other than the pressure vessel method. One alternative method is to use a packed bed, which is a cylinder packed with the sorbent. The ammonia gas would flow through one side of the packed bed, and the portion of the ammonia not adsorbed, if any, would exit the other side of the bed. Another method that could be used is to use a fluidized bed reactor.

TABLE 2

$NH_3$ loading over time for 13x (1/16" Pellets)

| Time (hr.) | wt. (g) | % Loaded |
|---|---|---|
| 0 | 15.00 | 0 |
| 0.5 | 16.5 | 10 |
| 1.0 | 16.8 | 12 |
| 1.5 | 17.07 | 13.8 |
| 2.0 | 17.37 | 15.8 |
| 2.5 | 17.47 | 16.5 |
| 3.0 | 17.47 | 16.5 |

3. EARLY RESULTS FOR DETERMINATION OF pH VS. TIME FOR VARIOUS TYPES OF MATERIALS

One very important fact to note is that these values of pH were obtained with a pH-meter electrode which was later determined to be improperly calibrated for future experimentation. Because of this, these values should be viewed relative to each other and not viewed as absolute values for the given conditions.

These values were obtained using a 3 liter pitcher approximately 1' in height, with the pH electrode placed 0.5" below the surface of the water. The sorbent material in question was first poured into the pitcher, then approximately 3 minutes were allowed to pass, at which time the pH was recorded.

TABLE 3 pH values for various materials

| Material Type | Weight Added (g) | Vol. Water (L) | pH value |
|---|---|---|---|
| Zeolite 4A (8 × 12" Beads) | 4.0 | 3.0 | 9.6 |
| Zeolite 5A (1/16" Pellets) | 5.0 | 3.0 | 9.8 |
| Zeolite 13X (8 × 12" Beads) | 4.0 | 3.0 | 9.81 |
| Zeolite 13X (1/16" Pellets) | 6.0 | 3.0 | 9.85 |
| Silica Gel (14-20 Mesh) | 6.0 | 3.0 | 9.42 |
| Envisorb A | 6.0 | 3.0 | 8.9 |

The above tests were repeated with a properly calibrated pH electrode, and upon completion of these tests, it was determined that both the 4A molecular sieve and Envisorb A should not be considered any further, due to the relatively low pH Ammonia water they created, with respect to the other types of molecular sieve under study.

While the pH value of the Ammonia water created by Silica Gel (14-20 Mesh) was one of the lowest values obtained, it was held over for further study due to the fact that it was believed to be much less expensive than the other materials. It was later determined that the savings on Silica Gel did not justify the extra amount of material required to achieve a high pH value.

4. pH VALUES VS. TIME

The next stage of development was to determine the pH vs. time for samples of each material. It was determined that a pH value of at least 10.3 was needed to begin dissolution of the film. Preferable values of pH were found to be between 10.5 and 11.0.

Because of this, if a material sample could not achieve the above stated pH values it was considered to be less effective and dropped from immediate consideration. Some of the less desirable material are probably still usable, but are not the most preferred materials. For instance, with better mixing and/or larger quantities of sorbent, some of these sorbents may still be adequate for use.

The following procedure was employed for pH vs. time tests.

1. A clear glass pot, having approximately an 8.5" diameter and a height of 4" was used to simulate a 2.5 L toilet bowl.
2. A 10 g amount of the loaded sorbent sample was then poured into the pot.
3. Once the sample was poured into the pot, pH values were recorded every 30 seconds until 4 minutes had elapsed. The pH values were taken at the center of the pot, approximately 0.5" below the surface of the water.

These tests were performed several times with the various materials. Performing these tests yielded the following values for pH vs. Time:

TABLE 4 pH vs. Time for Different Materials

| Material | wt. (g) | (L) | vol | pH @ 30 Second Intervals | | | | | | | | |
|---|---|---|---|---|---|---|---|---|---|---|---|---|
| | | | | 0 | 30 | 60 | 90 | 120 | 150 | 180 | 210 | 240 |
| *13 × (1/16") | 10 | 2.5 | | 8.15 | 10.12 | 10.52 | 10.59 | 10.6 | 10.58 | 10.56 | 10.5 | 10.54 |
| *13 × (1/16") | 8 | 2.5 | | 8.21 | 10.06 | 10.28 | 10.41 | 10.44 | 10.41 | 10.43 | 10.4 | 10.42 |
| 5A (1/16") | 10 | 2.5 | | 8.02 | 9.93 | 10.14 | 10.21 | 10.2 | 10.22 | 10.24 | 10.25 | 10.26 |
| Silica Gel (28-200) | 10 | 2.5 | | 8.16 | 9.54 | 9.63 | 9.77 | 9.84 | 9.85 | 10.03 | 9.99 | 9.99 |

Figure 2:
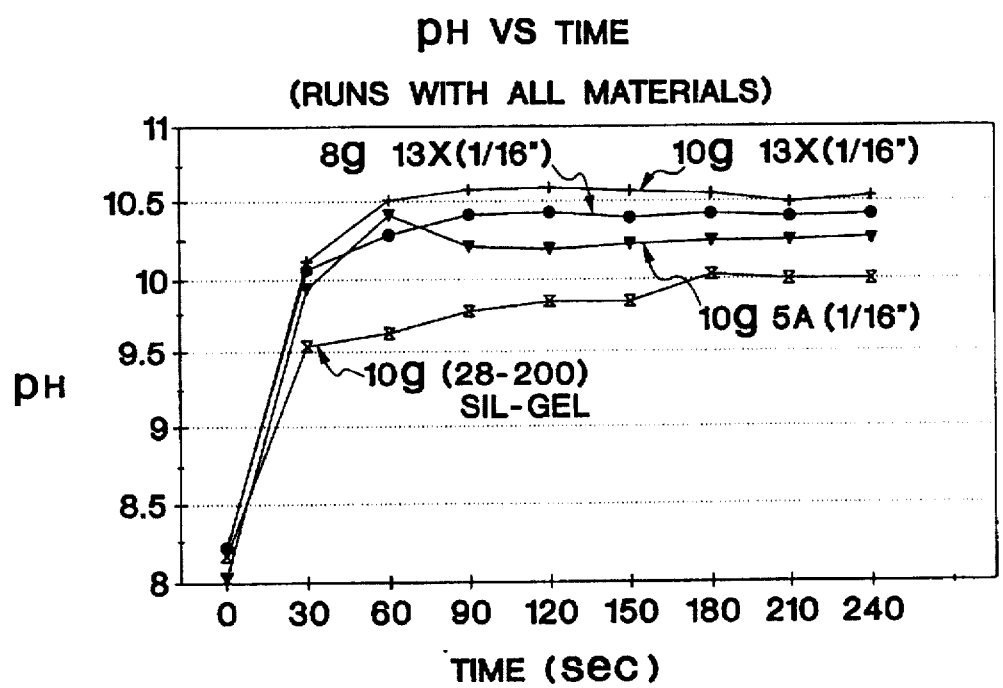
FIG. 2 is a graph showing pH vs. Time for different materials.

A graph of the above data was created and can be seen in FIG. 2.

Figure 3:
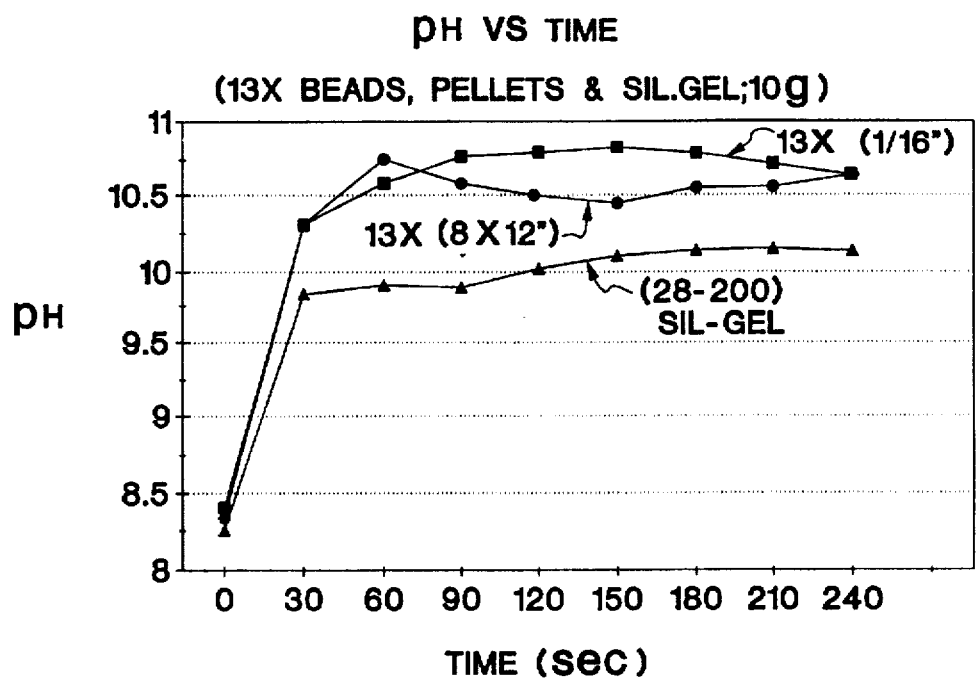
FIG. 3 is a graph showing pH vs. Time for different adsorptive materials.

A graph showing pH vs. Time for 13X beads, pellets and the Silica gel is shown in FIG. 3.

Figure 4:
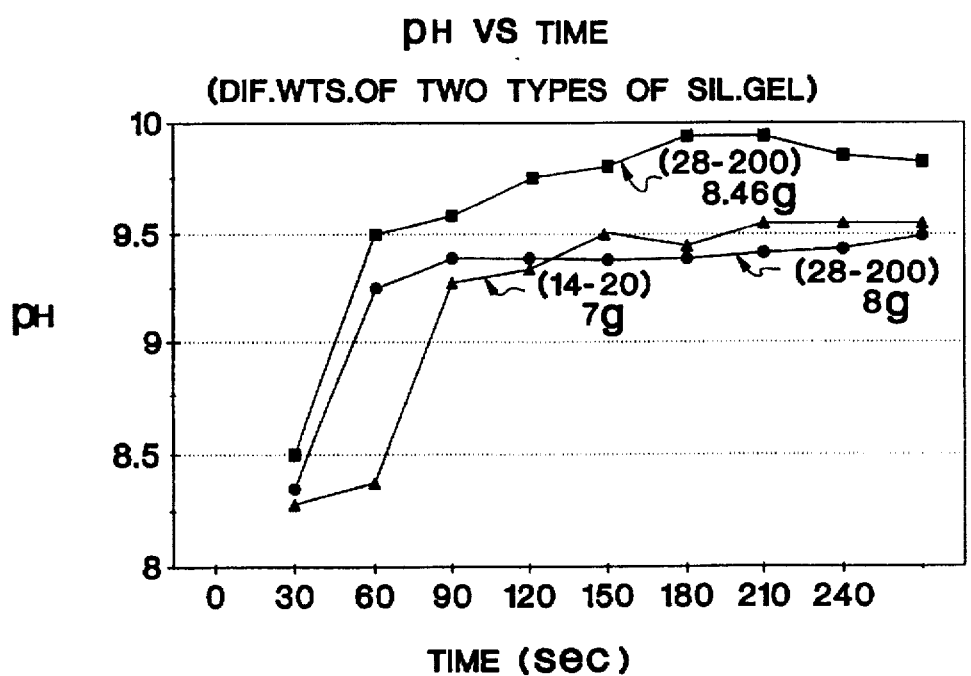
FIG. 4 is a graph showing pH vs. Time for different types of silica gel.

A graph showing pH vs. Time for two different types and weights of the Silica gel is shown in FIG. 4.

Figure 5:
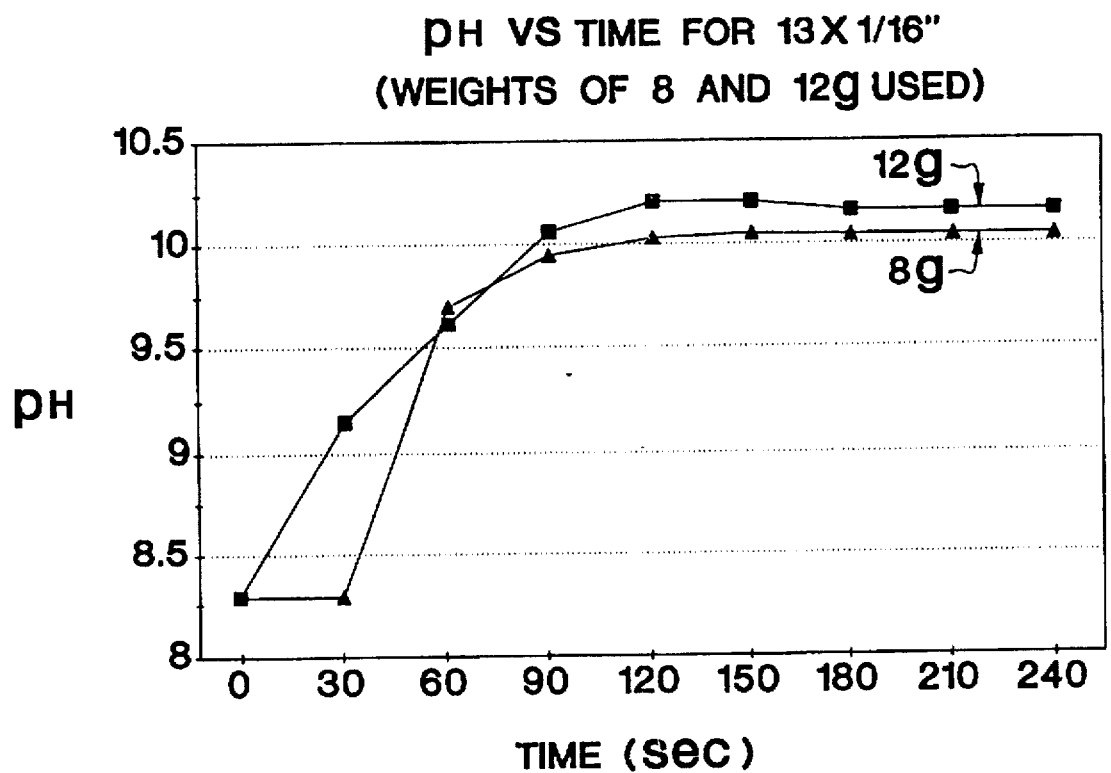
FIG. 5 is a graph showing pH vs. Time for adsorptive pellets of two different weights.

A graph showing pH vs. Time for two different weights of the 13X 1/16" pellets is shown in FIG. 5.

5. CONCLUSION

From the week completed, it appears that 13X1/16" pellets yield the best results, as seen in the above data. Therefore work on dissolving the pouches will focus around the use of 13X1/16" pellets.

Our experiments show that Zeolite Type 13X adsorbs about 16% of its weight in ammonia gas, Zeolite Type 4A adsorbs about 12% of its weight in ammonia gas, and Zeolite Type 5A adsorbed about 10%, and the Envisorb silica gel adsorbs 12% of its weight in ammonia gas. The molecular sieve or silica gel adsorbents, with adsorbed gas are referred to as loaded sorbents.

Figure 6:
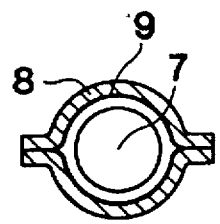
FIG. 6 is a cross-sectional view of the packet used with the present invention.

After loading by exposure to ammonia gas, the loaded sorbent 7 is then placed into an air and water tight container for storage. This is very important, since any moisture from the air will be adsorbed, causing the ammonia to desorb, which in turn causes the premature release of gaseous ammonia. A preferred storage container is a sealed packet or pouch 8 with an aluminum foil barrier material 9 as at least one layer (as shown in FIG. 6), although other barrier packages could also be used. The ammonia gas may slowly desorb within the pouch until an equilibrium is reached with the small amount of ammonia gas in the pouch, at which point no more ammonia will desorb from the sorbent.

The packet or pouch 8 can be stored for extended lengths of time prior to use of the contents due to the sealed nature of the packet or pouch. When ready for use, the contents of the pouch, the loaded sorbent material 7, is dropped into a container of water. In one preferred use of the loaded sorbents, the container of water is a toilet bowl. In another preferred embodiment, the container is a separate disposal pouch, such as a small plastic bag capable of holding an ostomy pouch, sanitary napkin, incontinence pad, etc. Water and at least one of the loaded sorbents would be placed into the disposal pouch and the pouch would be sealed. The aqua ammonia produced by contact of the loaded sorbents with water would dissolve the ostomy pouch, sanitary napkin, incontinence pad, etc.

The container or disposal pouch could also be virtually anything that holds water if the objective is simply to produce aqua ammonia. The above-mentioned sorbents have a much stronger affinity for water than for ammonia. As a result, the ammonia gas is desorbed as the water is adsorbed. The released ammonia then forms very small bubbles in the water and most of these bubbles are immediately dissolved into the water, forming ammonia water of a desired pH. This solution is sometimes referred to as aqua ammonia or ammonium hydroxide solution.

The solubility of ammonia gas in water is exceptionally high, perhaps the most water soluble of any gas known. In most cases, the release rate is slow enough and the solubility is high enough that the ammonia gas bubbles are not visible during the desorption process, so none of the ammonia is wasted by bubbling to the surface. The ammonia essentially instantaneously dissolves in the water. In the case of the Zeolite Type 13X molecular sieve material, small bubbles can be observed, and some of them bubble up through the water and escape into the atmosphere. If necessary, the release rate from the 13X (and other) sorbents can be slowed down by putting various additives into them, such as magnesium stearate. A slower release rate would further enhance the safe handling aspects of the loaded sorbent. In most cases, this will not be necessary. The Envisorb material also releases the ammonia quickly enough that it also produces visible bubbles.

EXAMPLE ONE

In one experiment, 8 grams of loaded 13X molecular sieve, in the form of 1/16" pellets, was placed into 2.5 liters of water, and the pH of the water was observed to rise to approximately 10.2 in 120 seconds. The ammonia was desorbed, and within 5 minutes the pH of the water was observed to be 10.5.

EXAMPLE TWO

In another case, 7 grams of the loaded silica gel material, type 14-20, was placed into 2.5 liters of water in a glass container, and the pH was observed to rise to 9.5 in approximately 150 seconds.

EXAMPLE THREE

In another case approximately 8.5 grams of type 28-200 silica gel material was placed in 2.5 liters of water, and the pH was observed to rise to approximately 10 in 180 seconds.

In all of the cases, no mixing was employed, and pH readings were taken near the top of the container. The diffusion of the ammonia was sufficient to raise the pH to the desired level. In the case of toilet flushable articles or devices, there are significant consumer benefits to not having to stir a chemical within a toilet bowl. Subsequent tests indicate that mixing the solution can further improve the pH values at the top of the water container. Diffusion will eventually produce a uniform pH of the ammonia water solution, and this is generally considered adequate.

While mixing is not the preferred option, it is still an option if an increase in the speed of attaining a uniform pH in the water solution is desirable. A simple stirring rod is the simplest of all methods to facilitate rapid mixing. If a non-contact system of mixing is desired, as it might be in the case of a toilet bowl, effervescent substances can be successfully employed for this purpose. Experiments have shown that the addition of an effervescent substance to the water can be used to facilitate rapid mixture of the ammonia throughout the water container. The bubbles, produced by the effervescent substance, agitate and mix the water as they rise to the surface of the container.

Examples of effervescent compounds can include, but are not limited to, acid/base reactive couplets, such as Citric Acid/Sodium Carbonate, Citric Acid/Sodium Bicarbonate, Citric Acid/Potassium Bicorbonate, Magnesium Carbonate/ Citric Acid. These couplets produce carbon dioxide bubbles upon contacting water (an alka seltzer tablet is an example of this type of compound).

Other effervescing substances include oxygen producing compounds, such as, but not limited to, an inorganic peroxide coupled with an alkaline chemical. An example of this type of compound is Efferdent brand denture cleaner.

The most preferred effervescent compound is molecular sieve pellets or beads loaded with a refrigerant gas, such as difloroethane or 1, 1, 1, 2 tetrafloroethane. Inert refrigerant gas bubbles, upon coming into contact with water, produce gas bubbles which do not interfere with the pH of the water. The chemical based effervescent compounds can change the pH of the water, since they either contain alkaline substances and/or release carbon dioxide gas which forms carbonic acid in contact with water.

This type of disposal of items such as ostomy pouch, sanitary napkins, incontinence pads, etc., is very convenient, easy and environmentally safe for people who are not at home where disposal is normally done. A person may carry a sealed packet in their pocket or purse without fear of an ammonia odor. When necessary to dispose of the ostomy pouch, sanitary napkin, incontinence pad, etc., he/she would merely find a public or private rest room, place it and the loaded sorbent material in the bowl of the toilet, wait until it dissolves and/or disperses, and then flush the toilet.

If a special selectively soluble plastic film is used to construct ostomy pouches, and other toilet flushable devices, the ostomy pouch can be made to dissolve by placing the used pouch in ammonia water at a pH of 10.3 or higher. The specialized soluble plastic film remains intact until it contacts a solution of water at a pH of 10.3 or greater. A preferred example of a selectively soluble plastic material is Goodrich Estane X-4655, made by B. F. Goodrich.

While it is very easy to make pH 10.3 or higher ammonia water in the lab, it is dangerous to have an ostomate (patient) carry concentrated ammonium hydroxide solution on his/her person. It may also be potentially dangerous to carry any form of caustic chemicals, which would cause the pH of the toilet bowl to change to pH 10.3 or higher. Using the package containing a loaded molecular sieve provides the patient with a very easy and safe way of carrying the ammonia in a purse, pocket, etc., and to then change the pH of the toilet bowl water to 10.3 or higher simply by emptying the packet into the toilet bowl.

In the case of a toilet that has a large "water spot" of about 3 liters, it would take only about 8 grams of loaded Zeolite Type 13X molecular sieve 1/16" pellets to bring about this pH change. 8 grams of sieve is very easy to package in a small foil pouch. In case of spillage, the loaded sieve will not irritate dry skin. In the case of wet skin, the release rate of ammonia is slowed down, and is not expected to irritate the skin as much as a liquid chemical would. The zeolite molecular sieves are quite environmentally acceptable to be flushed into sewage systems, since zeolite materials are currently used as water softening agents in clothes washing detergents.

If lesser amounts of molecular sieve pellets are desirable for cost and convenience issues in the case of flushable products, it is possible to minimize usage as follows:

1) At least some of the loaded sieve material can be placed directly into the used ostomy pouch. Water can be added to the inside of the pouch, and the pouch can then be sealed off. The pouch will then dissolve very rapidly from the inside out.

2) The loaded sorbent can be added into a separate pouch (plastic bag), which may be flushable, but not dissolvable by ammonia water. The loaded sorbent can be placed into the plastic bag along with some water, the used ostomy pouch or other item is then placed into the pouch. The pH within the bag, with one gram of loaded 13X molecular sieve and 250 milliliters of water, reaches a pH of approximately 10.5 in a matter of seconds. The dissolution time of the used ostomy pouch constructed of Estane X-4655 plastic material, with a wall thickness of 0.004 inches is then very rapid (about 3 minutes). The entire bag and dissolved contents can be flushed, or the contents only can be flushed in case one desired to retain the disposal bag.

3) The water can be mixed to more quickly distribute the ammonia throughout the water 4) A combination of the above methods can be used.

Other products such as, diaper backing sheets made from the selectively dissolvable material, can also be made to dissolve with this technique. Flushable medical devices which can benefit from this technology include liners for bed pans, urinary drainage bags, incontinence pads, sanitary napkin backing sheets, examination gloves, wound dressings, wound drainage bags, surgical drainage tubing, etc., or any device which upon use would become a biohazard disposal problem.

Other uses of the sorbent material could include making smelling salt formulations which can be created by adding water to small quantities of the loaded sorbents. Alternately, the smelling salt can be exposed to humid air rather than to water.

Various fertilizer formulations can use this technology. Ammonia can be handled safely on a small scale, whereas it normally is only available to farmers, growers, etc. with expensive capital equipment set up to use gaseous ammonia.

Aqua ammonia can be prepared for laboratory use without the need to store the standard 34% by weight ammonium hydroxide solution which is fairly dangerous.

In addition aqua ammonia can be used to enhance the effectiveness of various cleaning agents, such as glass and hard surface cleaners by adding the sorbent material to such cleaners. The adsorbed material can be stored safely until ready for use.

Although the method of producing ammonia water and the method of using the same according to the present invention has been described in the foregoing specification with considerable details, it is to be understood that modifications may be made to the invention which do not exceed the scope of the appended claims and modified forms of the present invention done by others skilled in the art to which the invention pertains will be considered infringements of this invention when those modified forms fall within the claimed scope of this invention.

What I claim as my invention is:

1. A method of producing sealed ammonia sorbents comprising:

selecting a container having a gas inlet, placing a sorbent material into said container, filling said container with ammonia gas through said gas inlet, allowing said ammonia gas to remain in contact with said sorbent material until said sorbent material is loaded with ammonia gas, removing said sorbent material and, sealing said sorbent material in an air tight container.

2. The method of producing sealed ammonia sorbents as claimed in claim 1 wherein said container is provided with a sealed lid.

3. The method of producing sealed ammonia sorbents as claimed in claim 1, wherein said air tight container is an aluminum foil pouch.

4. The method of producing sealed ammonia sorbents as claimed in claim 1, wherein said sorbent material is a molecular sieve.

* * * * *